US012665277B2

(12) United States Patent
He

(10) Patent No.: US 12,665,277 B2
(45) Date of Patent: Jun. 23, 2026

(54) DIELECTRIC WAVEGUIDE FILTER AND COMMUNICATION DEVICE

(71) Applicant: SAMSUNG ELECTRONICS CO., LTD., Suwon-si (KR)

(72) Inventor: Zhongxin He, Shenzhen (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 18/230,936

(22) Filed: Aug. 7, 2023

(65) Prior Publication Data

US 2024/0178537 A1 May 30, 2024

(30) Foreign Application Priority Data

Nov. 24, 2022 (CN) ........................ 202211485559.9

(51) Int. Cl.
*H01P 1/201* (2006.01)
*H01P 1/20* (2006.01)
*H01P 3/16* (2006.01)
*H01P 5/08* (2006.01)

(52) U.S. Cl.
CPC .............. *H01P 1/2002* (2013.01); *H01P 3/16* (2013.01); *H01P 5/087* (2013.01)

(58) Field of Classification Search
CPC ........ H01P 1/2002; H01P 1/2088; H01P 1/20; H01P 1/201; H01P 1/207; H01P 1/208; H01P 3/16
USPC .......................................................... 333/208
See application file for complete search history.

(56) References Cited

U.S. PATENT DOCUMENTS

2023/0261353 A1 * 8/2023 Park .................... H01Q 9/0485 343/702

* cited by examiner

*Primary Examiner* — Stephen E. Jones
(74) *Attorney, Agent, or Firm* — Sughrue Mion, PLLC

(57) ABSTRACT

A dielectric waveguide filter includes a dielectric body including a first and a second surfaces. The dielectric waveguide filter includes a metal plating covering an outer surface of the dielectric body. The dielectric waveguide filter includes a coupling structure formed a portion of the second surface. The coupling structure includes a coupling groove extending from the second surface into the dielectric body and including a coupling surface parallel to the second surface. The coupling structure includes an inner conductor at an annular center of the coupling groove that surrounds the inner conductor and separates the dielectric body into the inner conductor and an outer conductor. The inner conductor in the coupling groove includes a metal surface on the second surface. A distance between the coupling surface and the second surface is related to a coupling degree of the coupling structure.

20 Claims, 12 Drawing Sheets

| | Group delay | Size |
|---|---|---|
| Example of Fig. 1 | 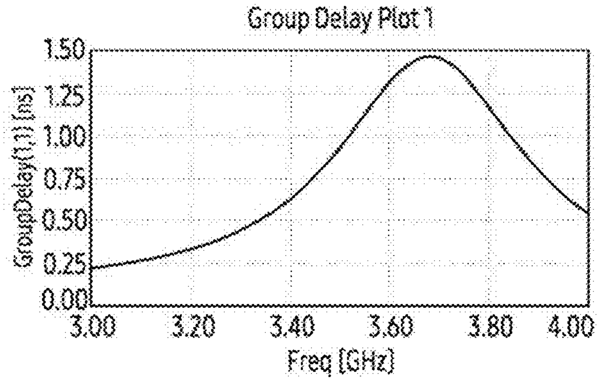<br>1.47ns@3.682G | Dielectric body: 10*10*5mm<br>Frequency blind hole: D3*H2.1mm<br>Coupling blind hole: D1.2*H2.1mm<br>Spacing between holes: 0.8mm |
| Example of Fig. 2a | 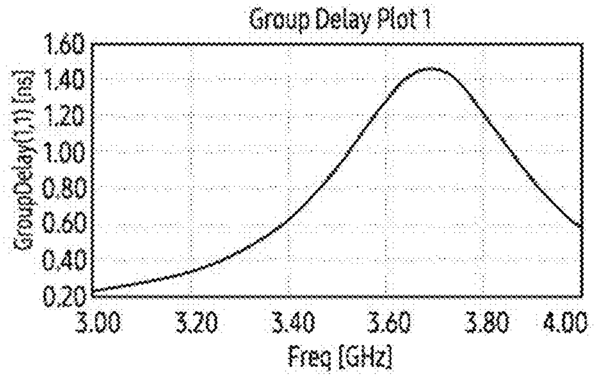<br>1.46ns@3.682G | Dielectric body: 10*10*5mm<br>Coupling blind hole: D3*H2.24mm<br>Coupling groove depth: H1.38mm<br>Spacing between holes: 1.38mm |
FIG. 3A

| | Group delay | Size |
|---|---|---|
| Example of Fig. 1 | 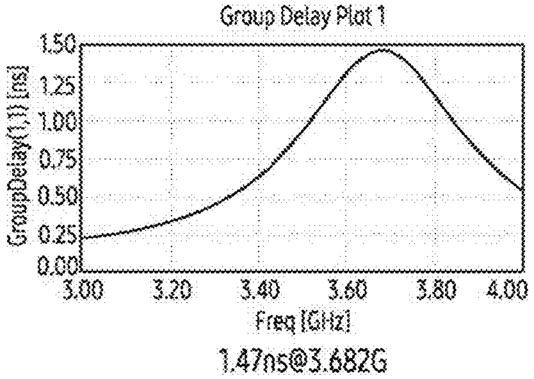<br><br>1.47ns@3.682G<br>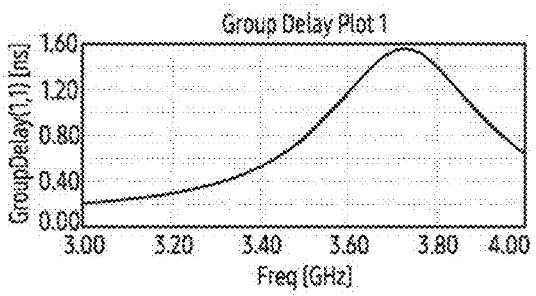<br><br>1.56ns@3.728G | Dielectric body: 10*10*5mm<br>Frequency blind hole: D3*H2.1mm<br>Coupling blind hole: D1.2*H2.1mm<br>Spacing between holes: 0.8mm<br>Non-metallization area: D1.5mm<br>Frequency: +46MHz<br>Group delay: -0.09ns |
| Example of Fig. 2a | 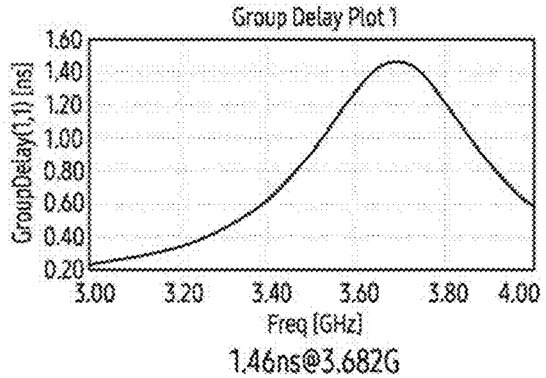<br><br>1.46ns@3.682G<br>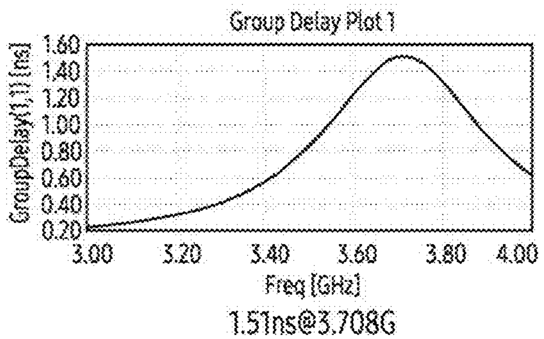<br><br>1.51ns@3.708G | Dielectric body: 10*10*5mm<br>Frequency blind hole: D3*H2.24mm<br>Coupling groove depth: H1.38mm<br>Spacing between holes:1.38mm<br>Non-metallization area: D1.5mm<br>Frequency: +26MHz<br>Group delay: -0.05ns |

FIG. 3B

| | Group delay | Size |
|---|---|---|
| Example of Fig. 1 | 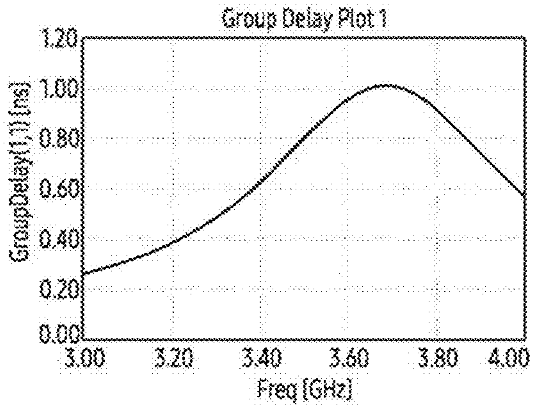<br>1.01ns@3.682G | Dielectric body: 10*10*5mm<br>Frequency blind hole: D3*H1.8mm<br>Coupling blind hole: D1.2*H2.73mm<br>Spacing between holes: 0.47mm |
| Example of Fig. 2a | 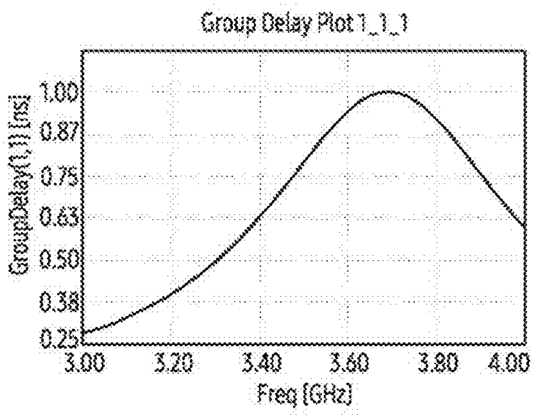<br>1.0ns@3.686G | Dielectric body: 9.5*9.5*5mm<br>Frequency blind hole: D3*H2.21mm<br>Coupling groove depth: H1.9mm<br>Spacing between holes: 0.89mm |
FIG. 3C

| | Group delay | Size |
|---|---|---|
| Example of Fig. 1 | 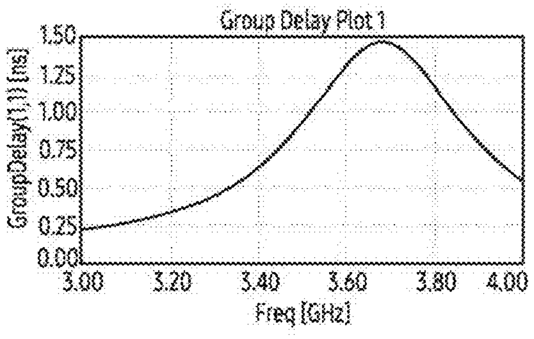<br>1.47ns@3.682G | Dielectric body: 10*10*5mm<br>Frequency blind hole: D3*H2.1mm<br>Coupling blind hole: D1.2*H2.1mm<br>Spacing between holes: 0.8mm |
| Example of Fig. 4a Coupling groove depth: 0.25mm | 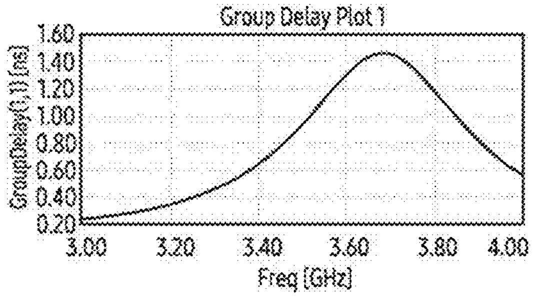<br>1.46ns@3.682G | Dielectric body: 10*10*5mm<br>Frequency blind hole: D3*H2.27mm<br>Coupling groove depth: H 0.25mm<br>Frequency blind hole: D1.2*H1.75mm<br>Spacing between holes: 0.98mm |
| Example of Fig. 4a Coupling groove depth: 0.6mm | 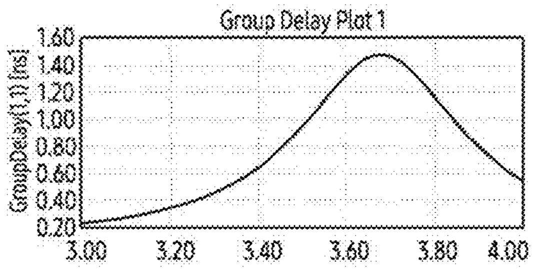<br>1.47ns@3.682G | Dielectric body: 10*10*5mm<br>Frequency blind hole: D3*H2.35mm<br>Coupling groove depth: H 0.6mm<br>Frequency blind hole: D1.2*H1.45mm<br>Spacing between holes: 1.2mm |

FIG. 6

DIELECTRIC WAVEGUIDE FILTER AND COMMUNICATION DEVICE

CROSS-REFERENCE TO RELATED APPLICATIONS

This application is based on and claims priority under 35 U.S.C. § 119 to Chinese Patent Application No. 202211485559.9, filed on Nov. 24, 2022, in the Chinese Intellectual Property Office, the disclosure of which is incorporated by reference herein its entirety.

BACKGROUND

1. Field

The disclosure relates to communication methods and devices, and particularly, to a dielectric waveguide filter and a communication device including the dielectric waveguide filter.

2. Description of Related Art

Dielectric waveguide filters are widely used in fifth generation (5G) communication systems.

SUMMARY

Provided are a dielectric waveguide filter and a communication device including the dielectric waveguide filter. A coupling structure is implemented by a coupling groove embedded in a dielectric body, which may realize a strong coupling strength and form a plane for soldering with a circuit board. A pin needle structure of the circuit board may be omitted.

According to an aspect of the disclosure, a dielectric waveguide filter includes: a dielectric body includes a first surface and a second surface that is opposite to the first surface; a metal plating covering an outer surface of the dielectric body: and a coupling structure provided at the second surface and including: a coupling groove extending from the second surface into the dielectric body and includes a coupling surface parallel to the second surface, the coupling surface not being covered with a metal layer; and an inner conductor provided at an annular center of the coupling groove that surrounds the inner conductor and that separates the dielectric body into the inner conductor and an outer conductor located outside the coupling groove. The inner conductor includes a metal surface on a same level with the second surface. A distance between the coupling surface and the second surface is related to a coupling degree of the coupling structure.

The coupling groove may further includes: an outer side wall that is perpendicular to the second surface and that extends into the dielectric body, the outer side wall being covered with the metal plating: and an inner side wall that is perpendicular to the second surface, that extends into the dielectric body, and that is symmetrically spaced from the outer side wall, wherein the inner side wall is provided as a peripheral wall of the inner conductor, wherein the inner side wall is covered with the metal plating, wherein the coupling surface is connected to top ends of the outer side wall and the inner side wall, and wherein a diameter size of the outer side wall is larger than a diameter size of the inner side wall.

The coupling groove may further includes a first chamfer connected downwardly between a top end of the outer side wall and an outer edge of the coupling surface.

The coupling groove may further include a first chamfer connected downwardly between the second surface and an outer edge of the coupling surface.

The coupling groove may further include a second chamfer connected downwardly between a top end of the inner side wall and an inner edge of the coupling surface.

The coupling groove may further include a second chamfer connected downwardly between the second surface and an inner edge of the coupling surface.

A surface of the first chamfer may be covered with the metal plating.

A surface of the first chamfer may be not covered with the metal plating.

A surface of a second chamfer may be covered with the metal plating.

A surface of a second chamfer may be not covered with the metal plating.

The outer side wall may be at least one of circular, triangular, and rectangular in cross-sectional shape along a direction parallel to the second surface, and wherein a spacing between the inner side wall and the outer side wall may be constant.

The inner conductor may further include a coupling blind hole that is recessed from the second surface into the dielectric body, wherein a depth of the coupling blind hole may be related to the coupling degree of the coupling structure.

The depth of the coupling blind hole may be greater than or equal to the distance between the coupling surface and the second surface.

The dielectric waveguide filter may further include a frequency blind hole that is recessed from the first surface into the dielectric body, wherein the frequency blind hole and the coupling surface may include a first spacing therebetween.

The coupling surface may be staggered with the frequency blind hole.

A communication device may include: the dielectric waveguide filter and a printed circuit board electrically connected to the second surface and the metal surface.

According to an aspect of the disclosure, a dielectric waveguide filter comprises a dielectric body comprising a first surface and a second surface that is opposite to the first surface. The dielectric waveguide filter comprises a metal plating covering an outer surface of the dielectric body. The dielectric waveguide filter comprises a coupling structure formed at least portion of the second surface. The coupling structure comprises a coupling groove extending from the second surface into the dielectric body and comprising a coupling surface parallel to the second surface. The coupling structure comprises an inner conductor formed at an annular center of the coupling groove that surrounds the inner conductor and separates the dielectric body into the inner conductor and an outer conductor located outside the coupling groove. The inner conductor in the coupling groove comprises a metal surface on the second surface. A distance between the coupling surface and the second surface is related to a coupling degree of the coupling structure.

According to an aspect of the disclosure, a communication device comprises a dielectric waveguide filter. The communication device comprises a dielectric body comprising a first surface and a second surface that is opposite to the first surface. The communication device comprises a metal plating covering an outer surface of the dielectric body. The communication device comprises a printed circuit board electrically coupled to a portion of the metal plating corresponding to the second surface. The communication device comprises a coupling structure formed at least portion of the second surface. The coupling structure comprises a coupling groove extending from the second surface into the dielectric body and comprising a coupling surface parallel to the second surface. The communication device comprises an inner conductor formed at an annular center of the coupling groove that surrounds the inner conductor and separates the dielectric body into the inner conductor and an outer conductor located outside the coupling groove. The inner conductor in the coupling groove comprises a metal surface on the second surface. A distance between the coupling surface and the second surface is related to a coupling degree of the coupling structure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A is a comparative diagram showing group delay characteristics and size parameters of comparative examples at a same delay:

FIG. 3B is a comparative diagram showing group delay characteristics and size parameters of comparative examples at a same debugging area:

FIG. 3C is a comparative diagram showing group delay characteristics and size parameters of comparative examples at a same delay:

FIG. 6 is a comparative diagram showing group delay characteristics and size parameters of comparative examples at a same delay.

DETAILED DESCRIPTION

For a better understanding of the above technical solutions, example embodiments of the disclosure will now be described in detail with reference to the accompanying drawings. Obviously, the described embodiments are merely a portion, but not all embodiments of the disclosure, and the disclosure is not limited to the example embodiments described herein.

Figure 1:
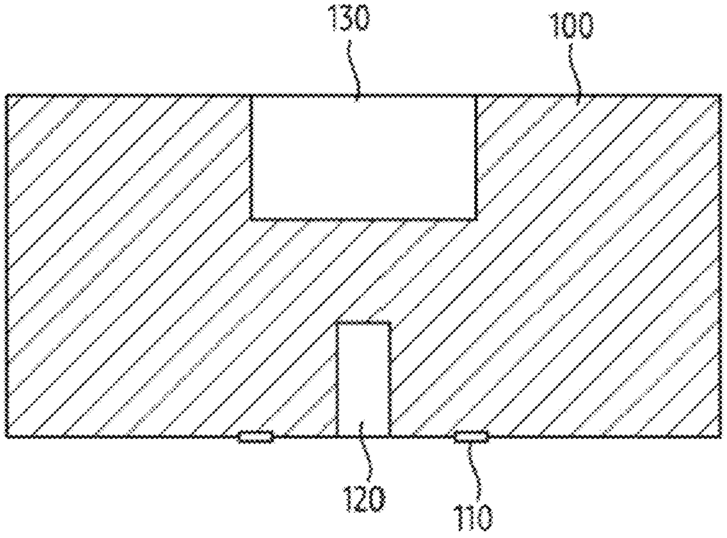
FIG. 1 [PRIOR ART]
FIG. 1 is a schematic structural diagram of an existing dielectric waveguide filter.

FIG. 1 illustrates a typical form of a coupling port in a dielectric waveguide filter. In FIG. 1, the dielectric single cavity 100 has a feed ring 110 and a coupling blind hole 120 at the bottom, and a frequency blind hole 130 at the top. Except for the feed ring 110, outer surfaces of the dielectric cavity are all metallization regions. The feed ring 110 divides the bottom into an inner conductor region and an outer conductor region, and energy is fed into the interior of the dielectric single cavity through the feed ring 110. The coupling blind hole 120 and the frequency blind hole 130 are used to adjust a frequency and a coupling, respectively. To facilitate soldering with a printed circuit board (PCB), it may be necessary to add a pin needle in the coupling blind hole 120 for auxiliary soldering.

The solution shown in FIG. 1 has the following problems.

First, a ceramic filter is formed by pressing, because the coupling blind hole 120 is opposite to the frequency blind hole 130, the thickness between the two holes is small, the production is more difficult, and the consistency is not well controlled.

Second, a region between the coupling blind hole 120 and the frequency blind hole 130 has a small thickness and a concentrated electric field. When debugging, a silver layer is polished to increase the frequency, but a port coupling is obviously weakened and the debugging is more difficult.

Third, a depth of the coupling blind hole 120 is related to a coupling strength, when a required coupling amount is large (for example, >400 MHZ), there is a case where the thickness between the two holes is too thin to be produced.

Fourth, in the pin needle for auxiliary soldering, due to different coefficients of thermal expansion between a metal and a ceramic, the pin needle will crack the ceramic during long-term use, resulting in a filter failure. If the pin needle is not used, a soldering region between the inner conductor and the PCB is small, resulting in a soldering risk.

Embodiments of the disclosure provide a dielectric waveguide filter and a communication device including the dielectric waveguide filter. A coupling structure is realized or implemented by a coupling groove embedded in a dielectric body, which may realize a strong coupling strength and form a plane for soldering with a circuit board. A pin needle structure of the circuit board may be omitted.

Figure 2A:
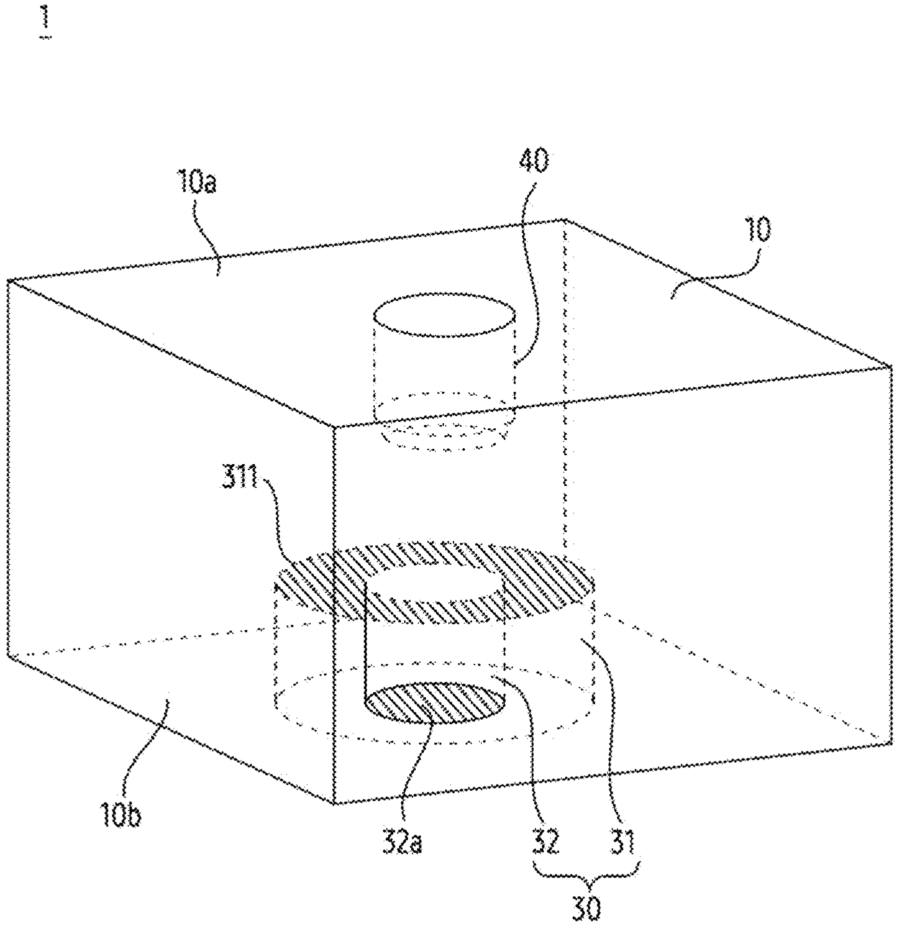
FIGS. 2A and 2B are a perspective view and a cross-sectional view of a dielectric waveguide filter according to an embodiment of the disclosure.
Figure 2B:
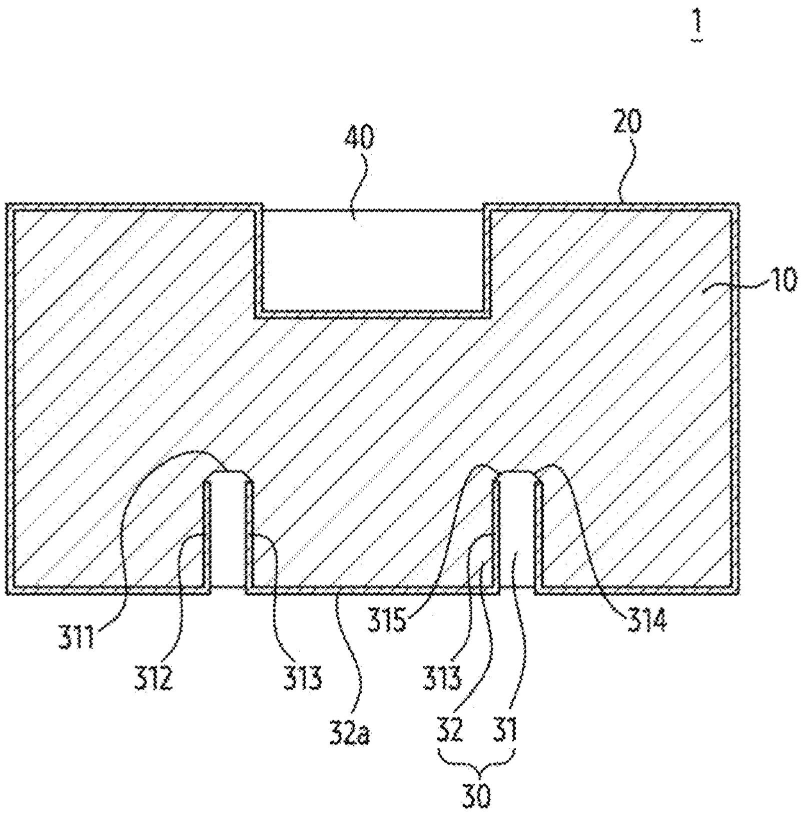

FIGS. 2A and 2B are a perspective view and a cross-sectional view of a dielectric waveguide filter according to an embodiment of the disclosure, respectively.

As shown in FIGS. 2A and 2B, a dielectric waveguide filter 1 includes a dielectric body 10 including a first surface 10*a* and a second surface 10*b* that is opposite to the first surface 10*a*: a metal plating 20 covering an outer surface of the dielectric body 10; and a coupling structure 30 on the second surface 10*b*. The coupling structure 30 includes: a coupling groove 31 formed or provided in an annular shape extending from the second surface 10*b* into the dielectric body 10 to form a coupling surface 311 parallel to the second surface 10*b* in the dielectric body 10, the coupling surface 311 not being covered with a metal layer; and an inner conductor 32 formed or provided at an annular center of the coupling groove 31, the coupling groove 31 surrounding the inner conductor 32 to separate the dielectric body 10 into the inner conductor 32 and an outer conductor located outside the coupling groove 31. The inner conductor 32 may have a metal surface 32*a* flush or on a same level with the second surface 10*b*.

A distance between the coupling surface 311 and the second surface 10*b* is related to a coupling degree of the coupling structure 30.

In an embodiment, the coupling groove 31 forms the coupling surface embedded in the dielectric body 10, and the coupling surface is not covered with the metal layer. The coupling groove 31 separates the inner conductor 32 from the dielectric body 10 outside the coupling groove 31 through the coupling surface 311 (e.g., non-conductive coupling surface) so that the dielectric body 10 outside the coupling groove 31 is formed as an outer conductor coupled with the inner conductor 32. The coupling groove 31 is equivalent to a section of a low-impedance transmission line. By adjusting a depth of the coupling groove 31, i.e., adjusting a distance between the coupling surface 311 and the second surface 10*b*, the coupling groove 31 may be equivalent to adjusting a length of the low-impedance transmission line and a position of a feed surface, thus changing a coupling strength of the port.

In an embodiment, the coupling groove 31 may already satisfy a port coupling, so the coupling blind hole 120 as shown in FIG. 1 may be not required, and thus, an inner conductor 32 in the coupling groove 31 (or referred as a feed groove) may have the metal surface 32*a* flush or on a same level with the second surface 10*b*. The metal surface 32*a* may be directly soldered with a PCB, so there is no need for an additional pin needle on the PCB.

Figure 4A:
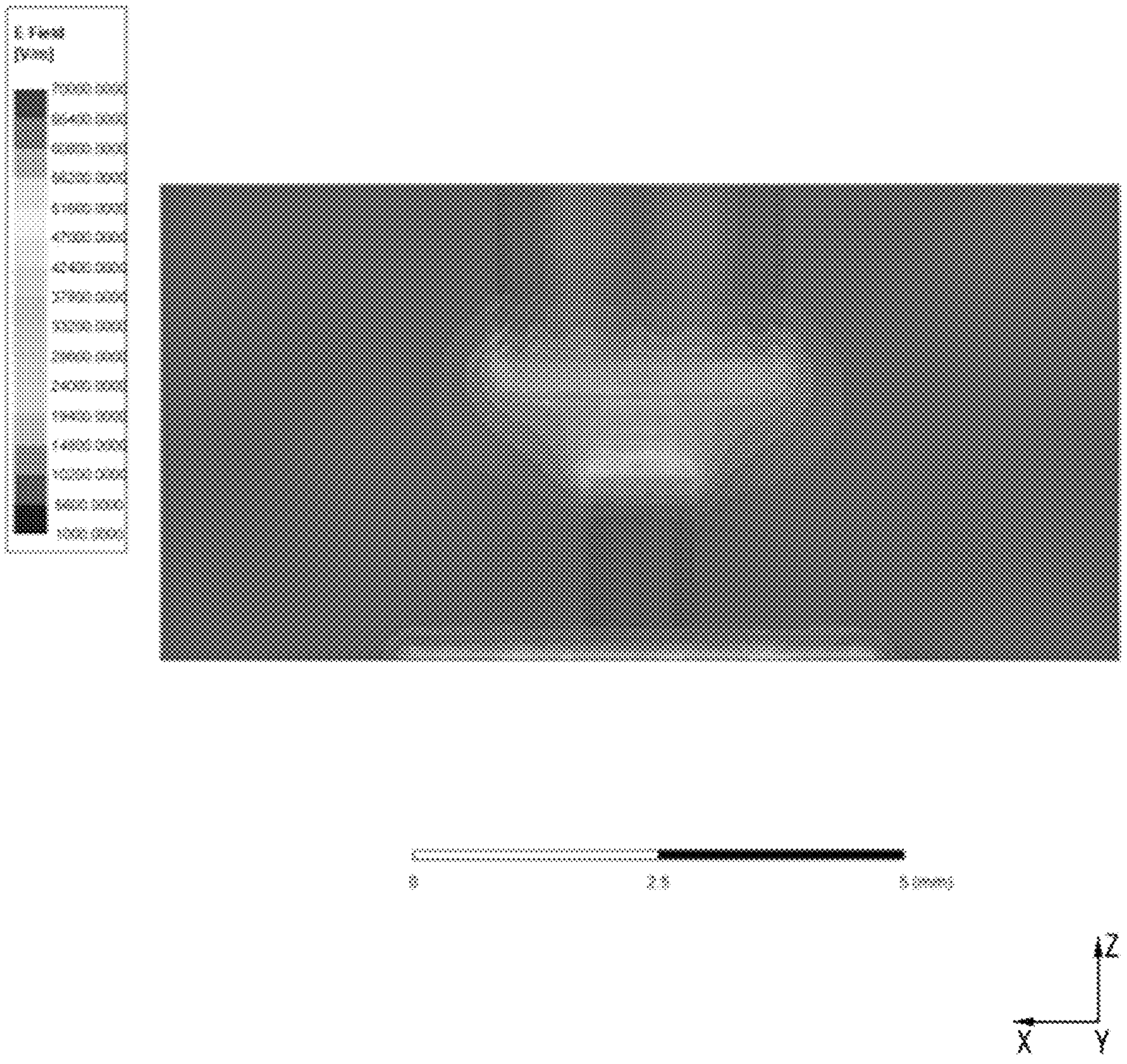
FIGS. 4A and 4B are electric field strength distribution diagrams of an existing dielectric waveguide filter and a dielectric waveguide filter of the disclosure.
Figure 4B:
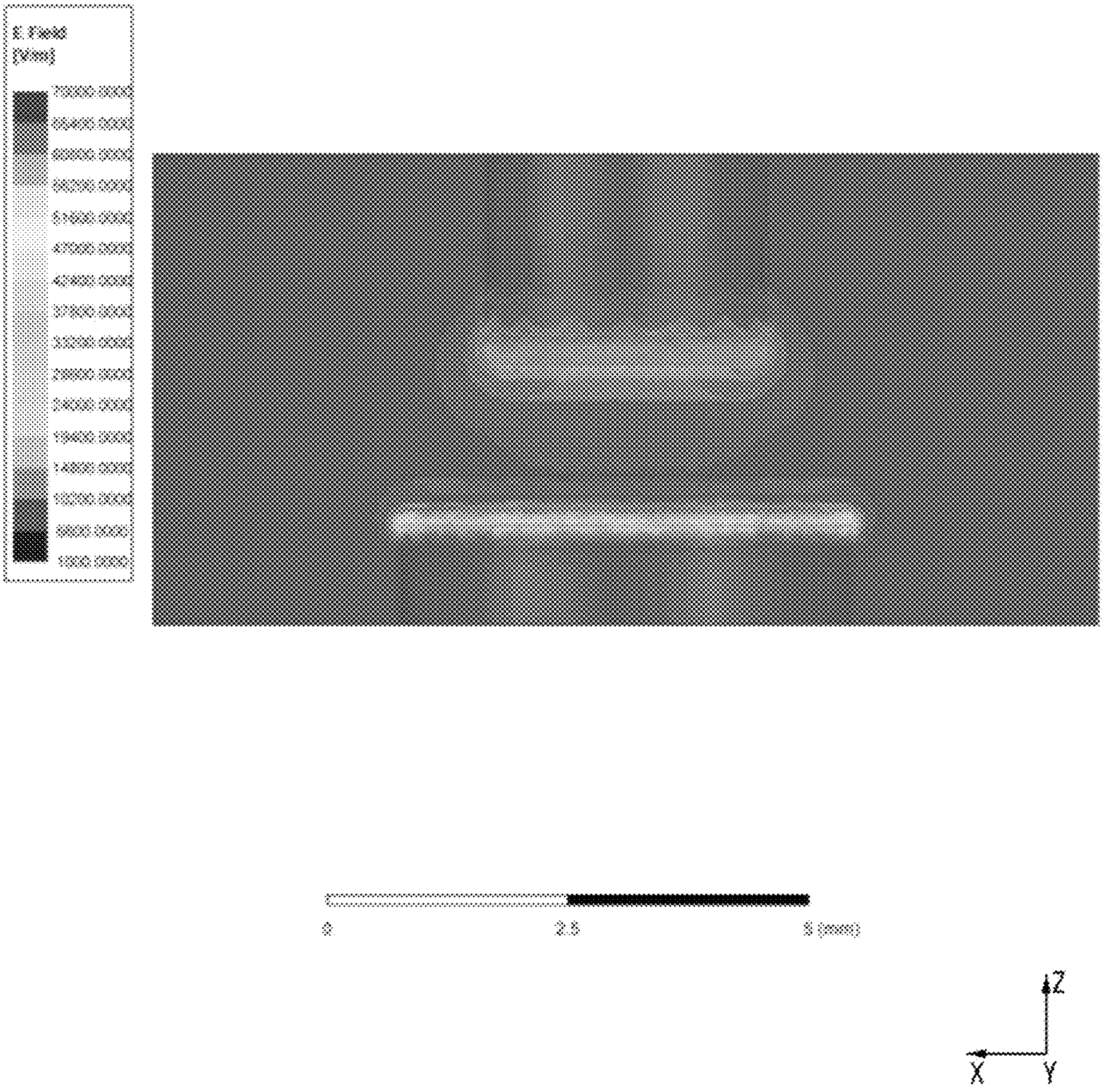

Further, the coupling strength of the port may be adjusted by adjusting a depth of the feed groove 31. By comparing FIG. 4A and FIG. 3B, a portion with a strong electric field strength is concentrated on a position of the coupling end face. In FIG. 4A, the portion with a strong electric field is a position of a top end of the coupling blind hole. In FIG. 4B, the portion with a strong electric field is a position of the coupling surface 311. Compared with the coupling structure shown in FIG. 1, the depth of the coupling groove 31 may be significantly less than a depth of the coupling blind hole at the same coupling strength. Therefore, such implementation of the present embodiment is a coupling structure of the feed groove 31, which may greatly reduce a depth of penetration of the coupling structure into the dielectric body, thereby reducing the frequency and coupling sensitivity. Therefore, the dielectric waveguide filter of the embodiment may be more suitable for production.

Specifically, as shown in FIGS. 2A and 2B, the coupling groove 31 includes: an outer side wall 312 perpendicular to the second surface 10*b* and extending into the dielectric body 10, the outer side wall 312 being covered with the metal plating 20; and an inner side wall 313 perpendicular to the second surface 10*b* and extending into the dielectric body 10 and symmetrically spaced from the outer side wall 312, the inner side wall 313 being formed or provided as a peripheral wall of the inner conductor 32, and the inner side wall 313 being covered with the metal plating 20.

The coupling surface 311 is connected to top ends of the outer side wall 312 and the inner side wall 313, and a diameter size of the outer side wall 312 is larger than a diameter size of the inner side wall 313.

In an embodiment, the outer side wall 312 may be one of circular, triangular, and rectangular in cross-sectional shape along a direction parallel to the second surface 10*b*, and a spacing between the inner side wall 313 and the outer side wall 312 may be constant.

The coupling groove 31 shown in FIGS. 2A and 2B is realized or implemented in the form of a circular ring. The inner conductor 32 is realized or implemented in the form of a cylinder, its side wall is enclosed by the inner side wall 313 of the coupling groove 31, and its bottom is covered with metal and is flush or on a same level with the second surface 10*b*. The top of the inner conductor 32 and the dielectric body are integrally connected. And the inner conductor 32 is isolated from the outer dielectric body covered with the metal plating 20 through the coupling groove 31, thereby forming a coupling form of the inner conductor and the outer conductor.

In an embodiment, the dielectric waveguide filter shown in FIGS. 2A and 2B further includes: a frequency blind hole 40 recessed from the first surface 10*a* into the dielectric body 10. The frequency blind hole 40 and the coupling surface 311 have a first spacing therebetween.

In an embodiment, the coupling surface 311 is staggered with the frequency blind hole 40. That is, a diameter, particularly an inner diameter, of the coupling groove 31 is larger than a diameter of the frequency blind hole 40.

Referring to FIG. 3A, a single cavity group delay is used to characterize the coupling strength. In a specific example, a size of an example dielectric body shown in FIG. 1 is 10*10*5 mm, a size of the frequency blind hole 130 is D3*H2.1 mm, and a size of the coupling blind hole 120 is D1.2*H2.1 mm. A spacing between the frequency blind hole and the coupling blind hole is 0.8 mm. A size of an example dielectric body shown in FIG. 2A is 10*10*5 mm, a size of the frequency blind hole 40 is D3*H2.24 mm, and a size of the coupling groove 31 is H1.38 mm. A spacing between the frequency blind hole 40 and the coupling groove 31 is 1.38 mm.

In an embodiment, the spacing between the coupling groove and the frequency blind hole is increased by 72.5% compared with an existing coupling structure at the same coupling strength. Moreover, the coupling groove is staggered with the frequency blind hole, which reduces the sensitivity and makes the production easy.

Referring to FIG. 3B, same debugging areas are compared. In a specific example, the size of the example dielectric body shown in FIG. 1 is 10*10*5 mm, the size of the frequency blind hole 130 is D3*H2.1 mm, and the size of the coupling blind hole 120 is D1.2*H2.1 mm. The spacing between the frequency blind hole and the coupling blind hole is 0.8 mm. In an embodiment, when a diameter of a non-metallization area is D1.5 mm, a debugging result thereof is that the frequency increases by 46 MHZ, and the group delay decreases by 0.09 ns.

The size of the example dielectric body shown in FIG. 2A is 10*10*5 mm, the size of the frequency blind hole 40 is D3*H2.24 mm, and the size of the coupling groove 31 is H1.38 mm. The spacing between the frequency blind hole and the coupling groove is 1.38 mm. In one embodiment, the diameter of the non-metallization area is D1.5 mm, the debugging result is that the frequency increases by 26 MHZ, and the group delay decreases by 0.05 ns.

In an embodiment, at the same debugging area, the coupling structure of the embodiment reduces a frequency change by 43% and a coupling change by 44%. Therefore, an influence of the debugging of the embodiment on the coupling and the frequency is weakened.

Referring to FIG. 3C, bandwidth cases at the same group delay characteristic are compared. In a specific example, with a delay of 1 ns as a target, the size of the example dielectric body shown in FIG. 1 is 10*10*5 mm, the size of the frequency blind hole 130 is D3*H1.8 mm, and the size of the coupling blind hole 120 is D1.2*H2.73 mm. The spacing between the frequency blind hole and the coupling blind hole is 0.47 mm. This spacing may be too small to realize production.

The size of the example dielectric body shown in FIG. 2A is 9.5*9.5*5 mm, the size of the frequency blind hole 40 is D3*H2.21 mm, and the size of the coupling groove 31 is H1.9 mm. The spacing between the frequency blind hole and the coupling groove is 0.89 mm.

In an embodiment, the spacing between the coupling groove and the frequency blind hole is increased by 89% compared with the existing coupling structure at the same coupling strength. Moreover, for the existing coupling structure, the delay of 1 ns may be achieved with a spacing of 0.47 mm between two blind holes, but the structure may be too thin to be produced.

Further, the existing port coupling structure, as shown in FIG. 4A, has an electric field concentrated between the frequency blind hole and the coupling blind hole. When the bottom of the frequency blind hole increases the frequency by destroying the metal layer, a corresponding coupling will decrease greatly, causing debugging difficulties. However, in the coupling structure of the embodiment, as shown in FIG. 4B, since the frequency blind hole is staggered with the coupling groove and a distribution of the electric field changes, the influence on the coupling during frequency debugging is weak, facilitating production debugging.

In an embodiment, as shown in FIG. 2B, the coupling groove 31 includes: a first chamfer 314 connected downwardly between the top end of the outer side wall 312 and an outer edge of the coupling surface 311 or connected downwardly between the second surface 10*b* and the outer edge of the coupling surface 311: and/or a second chamfer 315 connected downwardly between the top end of the inner side wall 313 and an inner edge of the coupling surface 311 or connected downwardly between the second surface 10*b* and the inner edge of the coupling surface 311.

In an embodiment, the first chamfer 314 is covered or not covered with the metal plating 20; and/or the second chamfer 315 is covered or not covered with the metal plating 20.

To facilitate production and processing, the coupling groove 31 may have the first chamfer 314 and the second chamfer 315, which may also be rounded instead. And inclination angles of the first chamfer 314 and the second chamfer 315 may be configured to be the same or different.

In an embodiment, the depth of the coupling groove 31 may be less than a length of the first chamfer 314, so that the coupling groove 31 has only the coupling surface 311 and a chamfer face, and both are non-metallization faces. In an embodiment, the depth of the coupling groove 31 may be greater than the length of the first chamfer 314, so that the coupling groove 31 has the coupling surface 311, the chamfer face, and the inner side wall and/or the outer side wall. The coupling surface 311 and the chamfer face are both non-metallization faces, and the inner side wall and/or the outer side wall are still metallization faces.

Figure 5A:
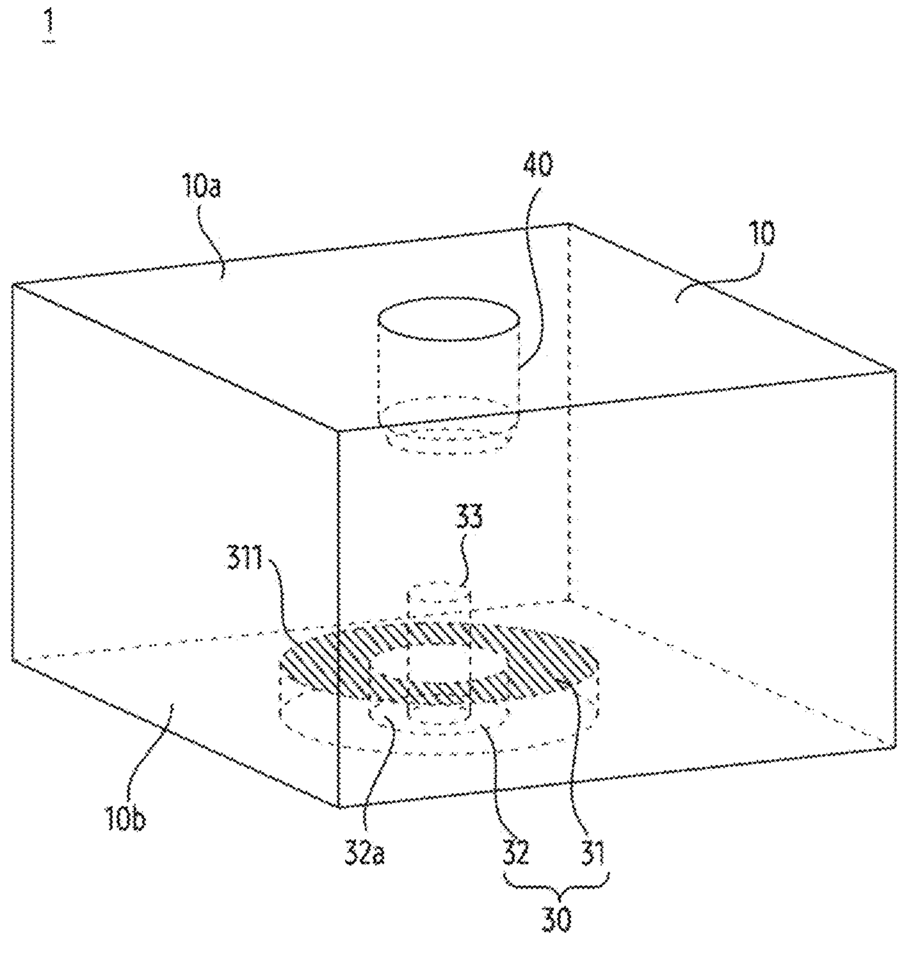
FIGS. 5A and 5B are a perspective view and a cross-sectional view of a dielectric waveguide filter according to an embodiment of the disclosure.
Figure 5B:
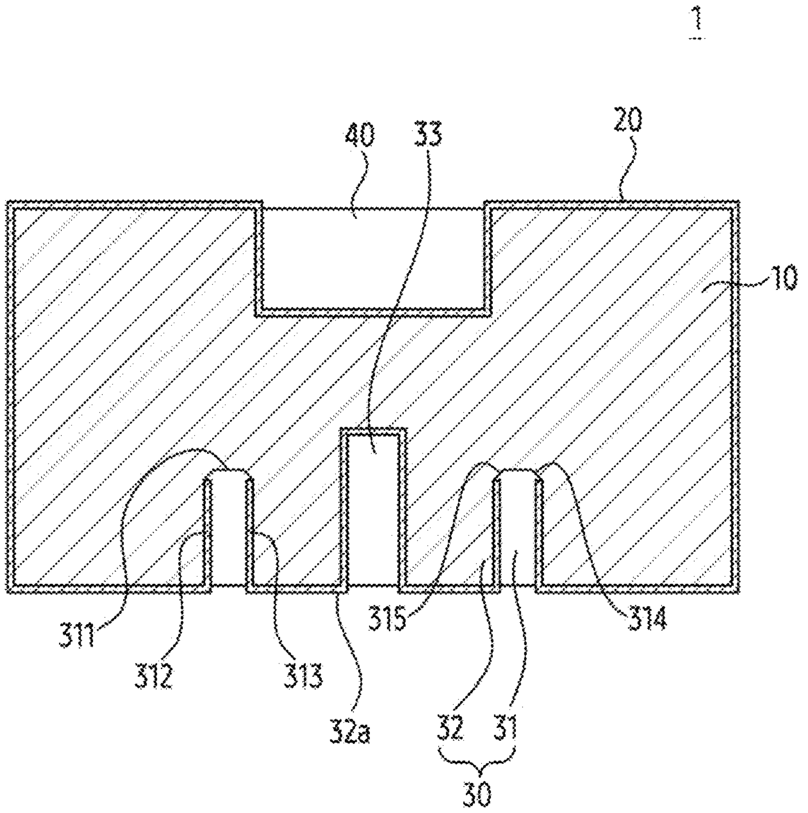

FIGS. 5A and 5B are a perspective view and a cross-sectional view of a dielectric waveguide filter according to an embodiment of the disclosure, respectively. As shown in FIGS. 5A and 5B, also provides a dielectric waveguide filter, and the inner conductor 32 further includes: a coupling blind hole 33 recessed from the second surface 10*b* into the dielectric body 10, a depth of the coupling blind hole 33 being related to the coupling degree of the coupling structure 30.

In an embodiment, the depth of the coupling blind hole 33 is greater than or equal to the distance between the coupling surface 311 and the second surface 10*b.*

In addition to a first coupling structure constituted by the coupling groove 31, the embodiment also provides a second coupling structure formed or provided by the coupling blind hole 33. The two coupling structures are superimposed on each other to jointly realize port coupling. Since the coupling groove 31 strengthens the coupling, the depth of the coupling blind hole 33 may be reduced, thereby simplifying processing difficulties. Since the two coupling structures cooperate, both may be realized in a smaller size, and sizes of the coupling structures may also be effectively reduced, further increasing the spacing from the frequency blind hole.

In FIG. 6, the single cavity group delay is used to characterize the coupling strength, and a same group delay may be realized by adjusting depths of the coupling groove and the frequency blind hole. In an embodiment, the size of the example dielectric body shown in FIG. 1 is 10*10*5 mm, the size of the frequency blind hole 130 is D3*H2.1 mm, and the size of the coupling blind hole 120 is D1.2*H2.1 mm. The spacing between the frequency blind hole and the coupling blind hole is 0.8 mm. The size of the example dielectric body shown in FIG. 2A is 10*10*5 mm, the size of the frequency blind hole 40 is D3*H2.24 mm, and the size of the coupling groove 31 is H1.38 mm. The spacing between the frequency blind hole and the coupling groove is 1.38 mm.

Figure 7:
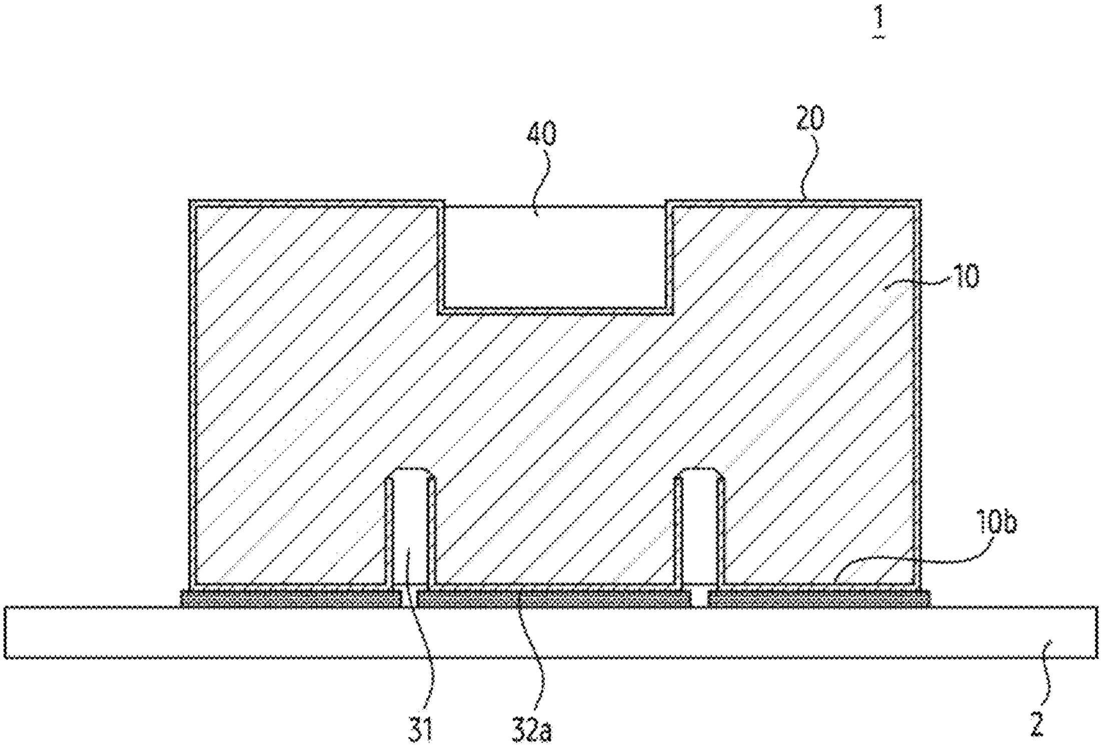
FIG. 7 is a schematic structural diagram of a communication device according to an embodiment of the disclosure.

FIG. 7 is a structural schematic diagram of a communication device according to an embodiment of the disclosure. In FIG. 7, a communication device includes: the dielectric waveguide filter 1 as shown in FIG. 2A or FIG. 5A: and a printed circuit board (PCB) 2 electrically connected to the second surface 10*b* and the metal surface 32*a.*

In an embodiment, the coupling groove forms or provides the coupling surface embedded in the dielectric body, and the coupling surface is not covered with the metal layer. The coupling groove separates the inner conductor from a dielectric body outside the coupling groove through a non-conductive coupling surface so that the dielectric body outside the coupling groove is formed or provided as an outer conductor coupled with the inner conductor. The coupling groove is equivalent to a section of a low-impedance transmission line, and by adjusting a depth of the groove, i.e., adjusting a distance between the coupling surface and the second surface, the coupling groove may be equivalent to adjusting a length of the low-impedance transmission line and a position of a feed surface, thereby changing a coupling strength of the port.

In an embodiment, the coupling groove may already satisfy the port coupling, so an existing coupling blind hole may be not required, and thus, an inner conductor in a feed groove may have the metal surface flush or on a same level with the second surface. The metal surface may be directly soldered with a PCB, so there may be no need for an additional pin needle on the PCB.

Further, the coupling strength of the port may be adjusted by adjusting a depth of the feed groove. Compared with an existing coupling structure, the depth of the coupling groove may be significantly less than the depth of the coupling blind hole at the same coupling strength. Thus, such implementation of the embodiment is a coupling structure of the feed groove, which may greatly reduce a depth of penetration of the coupling structure into the dielectric body, thereby reducing the frequency and coupling sensitivity. Thus, the dielectric waveguide filter of the embodiment is more suitable for production.

According to embodiments, a dielectric waveguide filter comprises a dielectric body comprising a first surface and a second surface that is opposite to the first surface. The dielectric waveguide filter comprises a metal plating covering an outer surface of the dielectric body. The dielectric waveguide filter comprises a coupling structure provided at the second surface. The coupling structure comprises a coupling groove extending from the second surface into the dielectric body and comprising a coupling surface parallel to the second surface. The coupling surface is not covered with a metal layer. The coupling structure comprises an inner conductor provided at an annular center of the coupling groove that surrounds the inner conductor and separates the dielectric body into the inner conductor and an outer conductor located outside the coupling groove. The inner conductor comprises a metal surface on a same level with the second surface. A distance between the coupling surface and the second surface is related to a coupling degree of the coupling structure.

In an embodiment, the coupling groove further comprises an outer side wall that is perpendicular to the second surface and extends into the dielectric body, the outer side wall being covered with the metal plating. The coupling groove further comprises an inner side wall that is perpendicular to the second surface, extends into the dielectric body, and that is symmetrically spaced from the outer side wall. The inner side wall is provided as a peripheral wall of the inner conductor. The inner side wall is covered with the metal plating. The coupling surface is connected to top ends of the outer side wall and the inner side wall. A diameter size of the outer side wall is larger than a diameter size of the inner side wall.

In an embodiment, the coupling groove further comprises a first chamfer connected downwardly between a top end of the outer side wall and an outer edge of the coupling surface.

In an embodiment, the coupling groove further comprises a first chamfer connected downwardly between the second surface and an outer edge of the coupling surface.

In an embodiment, the coupling groove further comprises a second chamfer connected downwardly between a top end of the inner side wall and an inner edge of the coupling surface.

In an embodiment, the coupling groove further comprises a second chamfer connected downwardly between the second surface and an inner edge of the coupling surface.

In an embodiment, a surface of the first chamfer is covered with the metal plating.

In an embodiment, a surface of the first chamfer is not covered with the metal plating.

In an embodiment, a surface of a second chamfer is covered with the metal plating.

In an embodiment, a surface of a second chamfer is not covered with the metal plating.

In an embodiment, the outer side wall is at least one of circular, triangular, and rectangular in cross-sectional shape along a direction parallel to the second surface. A spacing between the inner side wall and the outer side wall is constant.

In an embodiment, the inner conductor further comprises a coupling blind hole that is recessed from the second surface into the dielectric body. A depth of the coupling blind hole is related to the coupling degree of the coupling structure.

In an embodiment, the depth of the coupling blind hole is greater than or equal to the distance between the coupling surface and the second surface.

In an embodiment, the dielectric waveguide filter further comprises a frequency blind hole that is recessed from the first surface into the dielectric body. The frequency blind hole and the coupling surface comprises a first spacing therebetween.

In an embodiment, the coupling surface is staggered with the frequency blind hole.

According to embodiments, a communication device comprises the dielectric waveguide filter and a printed circuit board electrically connected to the second surface and the metal surface.

According to embodiments, a dielectric waveguide filter comprises a dielectric body comprising a first surface and a second surface that is opposite to the first surface. The dielectric waveguide filter comprises a metal plating covering an outer surface of the dielectric body. The dielectric waveguide filter comprises a coupling structure formed at least portion of the second surface. The coupling structure comprises a coupling groove extending from the second surface into the dielectric body and comprising a coupling surface parallel to the second surface. The coupling structure comprises an inner conductor formed at an annular center of the coupling groove that surrounds the inner conductor and separates the dielectric body into the inner conductor and an outer conductor located outside the coupling groove. The inner conductor in the coupling groove comprises a metal surface on the second surface. A distance between the coupling surface and the second surface is related to a coupling degree of the coupling structure.

In an embodiment, the coupling groove further comprises an outer side wall that is perpendicular to the second surface and extends into the dielectric body, the outer side wall being covered with a metal plating. The coupling groove further comprises an inner side wall that is perpendicular to the second surface, extends into the dielectric body, and that is symmetrically spaced from the outer side wall. The inner side wall is provided as a peripheral wall of the inner conductor. The inner side wall is covered with the metal plating. The coupling surface is connected to top ends of the outer side wall and the inner side wall. A diameter size of the outer side wall is larger than a diameter size of the inner side wall.

In an embodiment, the coupling groove further comprises a first chamfer connected downwardly between a top end of the outer side wall and an outer edge of the coupling surface.

In an embodiment, the coupling groove further comprises a first chamfer connected downwardly between the second surface and an outer edge of the coupling surface.

In an embodiment, the coupling groove further comprises a second chamfer connected downwardly between a top end of the inner side wall and an inner edge of the coupling surface.

In an embodiment, the coupling groove further comprises a second chamfer connected downwardly between the second surface and an inner edge of the coupling surface.

In an embodiment, a surface of the first chamfer is covered with the metal plating.

In an embodiment, a surface of the first chamfer is not covered with the metal plating.

In an embodiment, a surface of a second chamfer is covered with the metal plating.

In an embodiment, a surface of a second chamfer is not covered with the metal plating.

In an embodiment, the outer side wall is at least one of circular, triangular, and rectangular in cross-sectional shape along a direction parallel to the second surface. A spacing between the inner side wall and the outer side wall is constant.

In an embodiment, the inner conductor further comprises a coupling blind hole that is recessed from the second surface into the dielectric body. A depth of the coupling blind hole is related to the coupling degree of the coupling structure.

In an embodiment, the depth of the coupling blind hole is greater than or equal to the distance between the coupling surface and the second surface.

In an embodiment, the dielectric waveguide filter further comprises a frequency blind hole that is recessed from the first surface into the dielectric body. The frequency blind hole and the coupling surface comprises a first spacing therebetween.

In an embodiment, the coupling surface is staggered with the frequency blind hole.

In an embodiment, the metal surface is formed a surface of the inner conductor, the outer side wall, and the inner side wall among the surface of the inner conductor, the outer side wall, the inner side wall, and the coupling surface.

According to embodiments, a communication device comprises a dielectric waveguide filter. The communication device comprises a dielectric body comprising a first surface and a second surface that is opposite to the first surface. The communication device comprises a metal plating covering an outer surface of the dielectric body. The communication device comprises a printed circuit board electrically coupled to a portion of the metal plating corresponding to the second surface. The communication device comprises a coupling structure formed at least portion of the second surface. The coupling structure comprises a coupling groove extending from the second surface into the dielectric body and comprising a coupling surface parallel to the second surface. The communication device comprises an inner conductor formed at an annular center of the coupling groove that surrounds the inner conductor and separates the dielectric body into the inner conductor and an outer conductor located outside the coupling groove. The inner conductor in the coupling groove comprises a metal surface on the second surface. A distance between the coupling surface and the second surface is related to a coupling degree of the coupling structure.

In an embodiment, the coupling groove further comprises an outer side wall that is perpendicular to the second surface and extends into the dielectric body, the outer side wall being covered with a metal plating. The coupling groove further comprises an inner side wall that is perpendicular to the second surface, extends into the dielectric body, and that is symmetrically spaced from the outer side wall. The inner side wall is provided as a peripheral wall of the inner conductor. The inner side wall is covered with the metal plating. The coupling surface is connected to top ends of the outer side wall and the inner side wall. A diameter size of the outer side wall is larger than a diameter size of the inner side wall.

In an embodiment, the coupling groove further comprises a first chamfer connected downwardly between a top end of the outer side wall and an outer edge of the coupling surface. The coupling groove further comprises a second chamfer connected downwardly between the second surface and an inner edge of the coupling surface.

In an embodiment, the portion of the meatal plating corresponding to the second surface is soldered with the printed circuit board.

Although basic principles of the disclosure have been described above in connection with specific embodiments, strengths, advantages, effects, etc. mentioned in the disclosure are merely examples and not limitations, and these strengths, advantages, effects, etc. must be possessed by various embodiments of the disclosure. Furthermore, the specific details disclosed above are for purposes of example and understanding only and are not for limitation. The above details do not limit the disclosure to the specific details above that must be used to achieve it.

Block diagrams of elements, apparatus, devices, and systems referred to in the disclosure are merely examples and are not intended to require or imply that the connections, arrangements, and configurations must be performed in the manner shown in the block diagrams. These elements, apparatus, devices, and systems may be connected, arranged, and configured in any manner, as will be recognized by those skilled in the art. Words such as "comprising", "including", "having" are open-ended terms that mean "including, but not limited to", and may be used interchangeably therewith. The words "or" and "and" as used herein refer to the word "and/or" and may be used interchangeably therewith unless the context clearly dictates otherwise. The word "such as" as used herein refers to the phrase "such as, but not limited to", and may be used interchangeably therewith.

Components or steps may be decomposed and/or recombined in apparatus, devices, and methods of the disclosure. These decompositions and/or recombinations shall be considered as equivalent solutions to the disclosure.

The previous description of the disclosed aspects is provided to enable any person skilled in the art to make or use the disclosure. Various modifications to these aspects are readily apparent to those skilled in the art, and general principles defined herein may be applied to other aspects without departing from the scope of the disclosure. Therefore, the disclosure is not intended to be limited to the aspects shown herein but follow the widest scope consistent with the principles and novel features disclosed herein.

The foregoing description has been presented for purposes of illustration and description. Furthermore, this description is not intended to limit embodiments of the disclosure to the form disclosed herein. While various example aspects and embodiments have been discussed above, those of skill in the art will recognize that certain adaptations, modifications, variations, additions, and subcombinations thereof shall be contained within the scope of the disclosure.

What is claimed is:

1. A dielectric waveguide filter comprising:

a dielectric body comprising a first side and a second side that is opposite to the first side;

a metal plating covering at least a portion of an outer side of the dielectric body; and a coupling structure formed at the second side and comprising a coupling groove extending from the second side into the dielectric body and comprising a coupling side parallel to the second side, wherein the coupling groove has an inner side wall having an inner conductor and an outer side wall having an outer conductor, wherein the metal plating covers the second side, wherein at least a portion of the coupling side is not covered with a metal layer, and wherein a distance between the coupling side and the second side is related to a coupling degree of the coupling structure.

2. The dielectric waveguide filter of claim 1, wherein the outer side wall is perpendicular to the second side and extends into the dielectric body, wherein the outer side wall is covered with the metal plating, and the outer conductor comprises the metal plating covering the outer side wall, wherein the inner side wall is perpendicular to the second side and extends into the dielectric body, and the inner side wall is symmetrically spaced from the outer side wall, wherein the inner side wall is covered with the metal plating, and the inner conductor comprises the metal plating covering the inner side wall, wherein the coupling side is connected to top ends of the outer side wall and the inner side wall, and wherein a diameter size of the outer side wall is larger than a diameter size of the inner side wall.

3. The dielectric waveguide filter of claim 1, wherein the coupling groove further comprises a first chamfer connected downwardly between a top end of the outer side wall and an outer edge of the coupling side.

4. The dielectric waveguide filter of claim 3, wherein a side of the first chamfer is covered with a metal plating.

5. The dielectric waveguide filter of claim 3, wherein a side of the first chamfer is not covered with a metal plating.

6. The dielectric waveguide filter of claim 1, wherein the coupling groove further comprises a first chamfer connected downwardly between the second side and an outer edge of the coupling side.

7. The dielectric waveguide filter of claim 1, wherein the coupling groove further comprises a second chamfer connected downwardly between a top end of the inner side wall and an inner edge of the coupling side.

8. The dielectric waveguide filter of claim 7, wherein a side of the second chamfer is covered with a metal plating.

9. The dielectric waveguide filter of claim 7, wherein a side of the second chamfer is not covered with a metal plating.

10. The dielectric waveguide filter of claim 1, wherein the coupling groove further comprises a second chamfer connected downwardly between the second side and an inner edge of the coupling side.

11. The dielectric waveguide filter of claim 1, wherein the outer side wall is at least one of circular, triangular, or rectangular in cross-sectional shape along a direction parallel to the second side, and wherein a spacing between the inner side wall and the outer side wall is constant.

12. The dielectric waveguide filter of claim 1, wherein the inner conductor further comprises a coupling blind hole that is recessed from the second side into the dielectric body, and wherein a depth of the coupling blind hole is related to the coupling degree of the coupling structure.

13. The dielectric waveguide filter of claim 12, wherein the depth of the coupling blind hole is greater than or equal to the distance between the coupling side and the second side.

14. The dielectric waveguide filter of claim 13, further comprising a frequency blind hole that is recessed from the first side into the dielectric body, wherein the frequency blind hole and the coupling side comprise a first spacing therebetween.

15. The dielectric waveguide filter of claim 14, wherein the coupling side is staggered with the frequency blind hole.

16. The dielectric waveguide filter of claim 1, wherein the coupling groove is cylindrical in shape.

17. A communication device comprising:

a dielectric waveguide filter comprising:

a dielectric body comprising a first side and a second side that is opposite to the first side, a metal plating covering at least a portion of an outer side of the dielectric body, and a coupling structure formed at the second side; and a printed circuit board electrically coupled to a portion of the metal plating corresponding to the second side, wherein the coupling structure comprises a coupling groove extending from the second side into the dielectric body and comprising a coupling side parallel to the second side, wherein the coupling groove has an inner side wall having an inner conductor and an outer side wall having an outer conductor, wherein the metal plating covers the second side, wherein at least a portion of the coupling side is not covered with a metal layer, and wherein a distance between the coupling side and the second side is related to a coupling degree of the coupling structure.

18. The communication device of claim 17, wherein the outer side wall is perpendicular to the second side and extends into the dielectric body, wherein the outer side wall is covered with the metal plating, and the outer conductor comprises the metal plating covering the outer side wall, wherein the inner side wall is perpendicular to the second and extends into the dielectric body, and the inner side wall is symmetrically spaced from the outer side wall, wherein the inner side wall is covered with the metal plating, and the inner conductor comprises the metal plating covering the inner side wall, wherein the coupling side is connected to top ends of the outer side wall and the inner side wall, and wherein a diameter size of the outer side wall is larger than a diameter size of the inner side wall.

19. The communication device of claim 17, wherein the coupling groove further comprises a first chamfer connected downwardly between a top end of the outer side wall and an outer edge of the coupling side, and wherein the coupling groove further comprises a second chamfer connected downwardly between a top end of the inner side wall and an inner edge of the coupling side.

20. The communication device of claim 17, wherein the portion of the metal plating corresponding to the second side is soldered with the printed circuit board.

* * * * *